(12) United States Patent
Zheng et al.

(10) Patent No.: US 11,913,352 B2
(45) Date of Patent: Feb. 27, 2024

(54) COVER PLATE CONNECTIONS FOR A HOLLOW FAN BLADE

(71) Applicant: General Electric Company, Schenectady, NY (US)

(72) Inventors: Li Zheng, Niskayuna, NY (US); Nicholas Kray, Evendale, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/545,874

(22) Filed: Dec. 8, 2021

(65) Prior Publication Data

US 2023/0175401 A1 Jun. 8, 2023

(51) Int. Cl.
*F01D 5/14* (2006.01)
*F01D 5/18* (2006.01)

(52) U.S. Cl.
CPC .............. *F01D 5/147* (2013.01); *F01D 5/18* (2013.01); *F05D 2220/323* (2013.01); *F05D 2230/23* (2013.01); *F05D 2260/36* (2013.01)

(58) Field of Classification Search
CPC . F01D 5/147; F01D 5/16; F01D 5/282; F01D 5/18; F01D 5/189; F01D 5/20; F01D 5/12; F01D 9/02; F01D 9/041; F01D 5/188; F01D 11/008; F01D 25/06; F01D 5/14; F01D 5/22; F01D 5/288; F01D 5/3007; F01D 5/141; F01D 5/181; F01D 5/184; F01D 5/3046; F01D 5/34; F05D 2220/36; F05D 2300/603; F05D 2220/32; F05D 2220/323; F05D 2230/232; F05D 2230/23; F05D 2230/60; F05D 2260/96; F05D 2240/12; F05D 2240/30; F05D 2260/30; F05D 2260/36; F05D 2230/51; F05D 2240/126; F05D 2240/301; F05D 2260/22141; F04D 29/324; F04D 29/388; F04D 29/023; F04D 29/668
See application file for complete search history.

(56) References Cited

U.S. PATENT DOCUMENTS

| | | | |
|---|---|---|---|
| 3,644,060 A | 2/1972 | Bryan | |
| 6,238,182 B1 | 5/2001 | Mayer | |
| 7,980,817 B2 * | 7/2011 | Foose | F01D 5/147 415/200 |
| 8,016,547 B2 * | 9/2011 | Propheter-Hinckley | F01D 5/188 415/115 |
| 9,359,901 B2 * | 6/2016 | Evans | F02C 7/24 |
| 9,657,577 B2 * | 5/2017 | Weisse | F01D 5/16 |
| 10,364,683 B2 | 7/2019 | Snyder et al. | |
| 10,415,420 B2 | 9/2019 | Wasserman et al. | |

(Continued)

FOREIGN PATENT DOCUMENTS

| CN | 109751090 | 5/2019 |
|---|---|---|
| FR | 2112278 | 5/2023 |

(Continued)

*Primary Examiner* — Eric J Zamora Alvarez
(74) *Attorney, Agent, or Firm* — Hanley, Flight & Zimmerman, LLC (57) ABSTRACT

Cover plate connections for a hollow fan blade are disclosed. An example fan blade includes a hollow body including a surface defining an airfoil, the hollow body including an aperture extending through the surface, a cover plate, and at least one connection element to couple the cover plate to the surface such that the cover plate encloses the aperture.

20 Claims, 5 Drawing Sheets

(56) References Cited

U.S. PATENT DOCUMENTS

| | | | | |
|---|---|---|---|---|
| 11,639,685 B1* | 5/2023 | Zheng | ........................ | F01D 5/16 |
| | | | | 415/119 |
| 2011/0211965 A1 | 9/2011 | Deal et al. | | |
| 2016/0305443 A1* | 10/2016 | Schwarz | ................. | B23P 15/04 |
| 2017/0175534 A1 | 7/2017 | Ferber et al. | | |
| 2017/0314400 A1 | 11/2017 | Ahmad et al. | | |
| 2017/0343007 A1* | 11/2017 | Murdock | ................ | F01D 5/147 |

FOREIGN PATENT DOCUMENTS

| | | |
|---|---|---|
| WO | 2016133514 | 8/2016 |
| WO | 2016148695 | 9/2016 |

* cited by examiner

COVER PLATE CONNECTIONS FOR A HOLLOW FAN BLADE

FIELD OF THE DISCLOSURE

This disclosure relates generally to fan blades and, more particularly, to cover plate connections for a hollow fan blade.

BACKGROUND

In recent years, turbine engines have been increasingly utilized in a variety of applications and fields. Turbine engines include fan blades. The fan blades spin at high speed and subsequently compress airflow.

BRIEF DESCRIPTION OF THE DRAWINGS

FIG, 5 is another cross-sectional view of an example connection element that can be implemented according to examples disclosed herein.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily inter that two elements are directly connected and/or in fixed relation to each other. As used herein, stating that any part is in "contact" with other part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

DETAILED DESCRIPTION

A typical aircraft engine utilizes cavities to create hollow components to reduce the weight of the engine. Weight reduction in the aircraft engine can achieve fuel savings for the aircraft. Hollow fan blades are one such component. An aircraft engine can utilize hollow metallic fan blades to reduce the amount of metal required to make the blade. However, fan blades for use in an aircraft may need a greater thickness than other blades to be durable and/or to maintain strength upon impact (e.g., bird strike requirements, fatigue requirements). Hollow blades can be more susceptible to fragmenting in response to an impact, which can in turn damage surrounding engine components.

To address some of the issues presented by known fan blades in aircraft engines, examples disclosed herein provide multi-point cover plate connections for a hollow fan blade. In certain examples, a blade (e.g., fan blade) includes a hollow body including a surface defining a cavity, the hollow body including an aperture (e.g., opening) extending through the surface. In certain examples, the blade includes a cover plate and at least one connection element (e.g., an edge lip connection, a butt joint connection, a slip joint connection, a double slip connection, a mechanical interlock connection, a slip edge joint connection, etc.) to couple the cover plate to the surface. In certain examples, the cover plate encloses (e.g., partially encloses, fully encloses, etc.) the aperture. The cover plate can be used to protect and/or otherwise strengthen the hollow fan blade, for example.

In some examples, the at least one connection element is supplemented by a welded connection and/or an adhesive bond. In some examples, the at least one connection element is a thermal interference connection.

In some examples, the hollow body includes a rib disposed on the surface surrounding the aperture. In some examples, at least one connection element couples the cover plate to the rib. In some examples, the cover plate is coupled to the surface to form a continuous surface of the blade. In some examples, a cavity is enclosed by the surface and the cover plate. Accordingly, the hollow body can include a cavity.

Example multi-point cover plate connections disclosed herein can be applied to both closed and open rotor engine designs. For purposes of illustration only, FIG. 1 illustrates an example closed-rotor turbofan engine, and FIG. 2 illustrates an example open-rotor engine.

Figure 1:
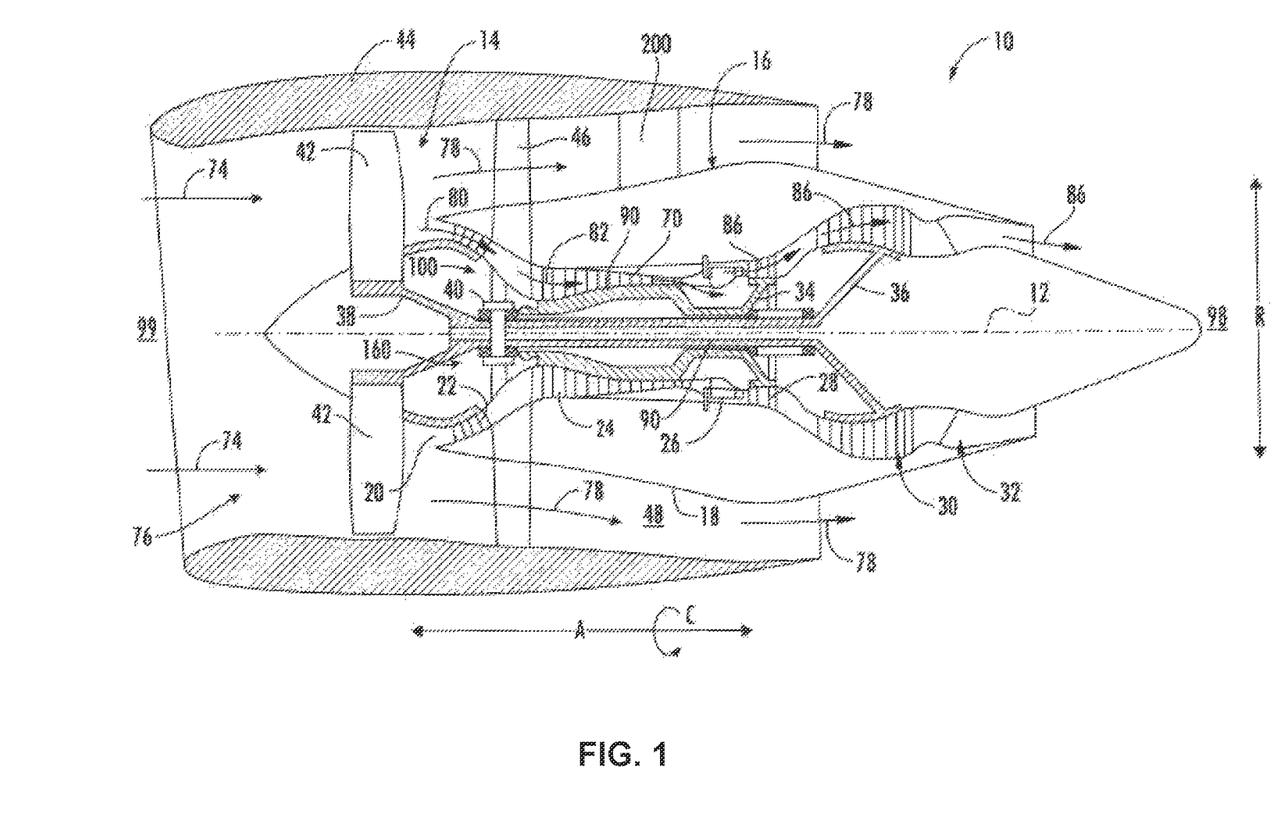
FIG. 1 is a cross-sectional view of an example closed rotor turbofan gas turbine engine in which examples disclosed herein may be implemented.
Figure 2:
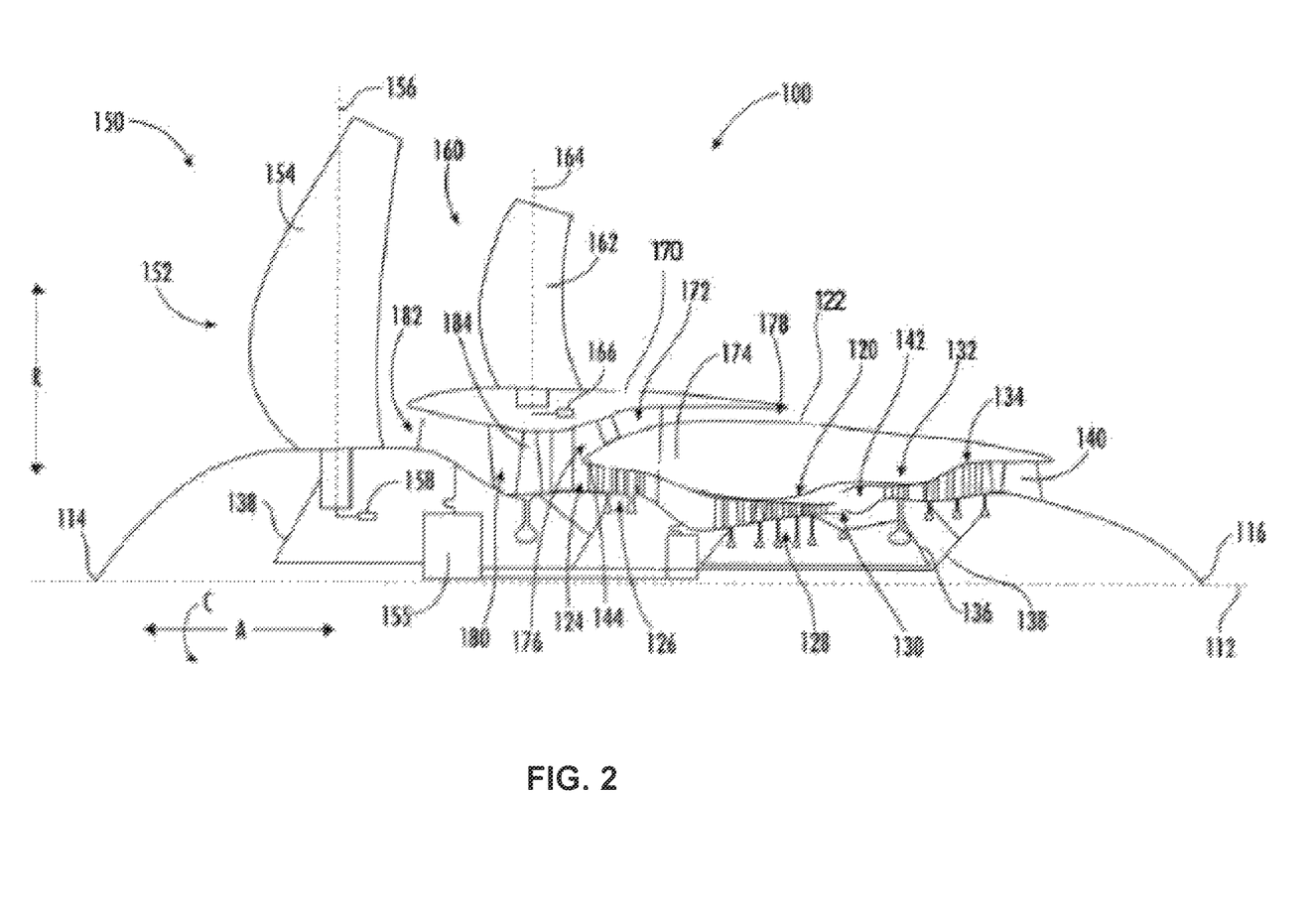
FIG. 2 is a cross-sectional view of an example open rotor engine in which examples disclosed herein may be implemented.

FIG. 1 is a cross-sectional view of a turbofan gas turbine engine in which examples disclosed herein may be implemented. Referring now to the drawings, FIG. 1 is a schematic partially cross-sectioned side view of an exemplary gas turbine engine 10 as may incorporate various examples of the present disclosure. The engine 10 may particularly be configured as a gas turbine engine for an aircraft. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14. For reference, the engine 10 defines an axial direction A, a radial direction R, and a circumferential direction C. In general, the axial direction A extends parallel to the axial centerline 12, the radial direction R extends outward from and inward to the axial centerline 12 in a direction orthogonal to the axial direction A, and the circumferential direction extends three hundred sixty degrees (360°) around the axial centerline 12.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a heat addition system 26, an expansion section or turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In certain examples, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. The fan blades 42 can include at least one of the fan blade assembly 300, further described in detail in FIG. 3. Additionally or alternatively, the fan blades 42 can include multiple connection elements 400, 500, 600, 700, 800, and/or 900, further described in detail in FIGS. 4-9, to couple an example cover plate 304 to ones of the fan blades 42. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a fan flow passage 48 therebetween. However, it should be appreciated that various configurations of the engine 10 may omit the nacelle 44, or omit the nacelle 44 from extending around the fan blades 42, such as to provide an open rotor or propfan configuration of the engine 10 depicted in FIG. 2.

It should be appreciated that combinations of the shafts 34, 36, the compressors 22, 24, and the turbines 28, 30 define a rotor assembly 90 of the engine 10. For example, the HP shaft 34, HP compressor 24, and HP turbine 28 may define a high speed or HP rotor assembly of the engine 10. Similarly, combinations of the LP shaft 36, LP compressor 22, and LP turbine 30 may define a low speed or LP rotor assembly of the engine 10. Various examples of the engine 10 may further include the fan shaft 38 and fan blades 42 as the LP rotor assembly. In certain examples, the engine 10 may further define a fan rotor assembly at least partially mechanically de-coupled from the LP spool via the fan shaft 38 and the reduction gear 40. Still further examples may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrow 80, enters the core engine 16 through an annular inlet 20 defined at least partially via the outer casing 18. The flow of air is provided in serial flow through the compressors 22,24, the heat addition system, and the expansion section via a core flowpath 70. The flow of air 80 is increasingly compressed as it flows across successive stages of the compressors 22, 24, such as shown schematically by arrows 82. The compressed air 82 enters the heat addition system 26 and mixes with a liquid and/or gaseous fuel and is ignited to produce combustion gases 86. It should be appreciated that the heat addition system 26 may form any appropriate system for generating combustion gases, including, but not limited to, deflagrative or detonative combustion systems, or combinations thereof. The heat addition system 26 may include annular, can, can-annular, trapped vortex, involute or scroll, rich burn, lean burn, rotating detonation, or pulse detonation configurations, or combinations thereof.

The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1 depicts and describes a two-stream engine having the fan flow passage 48 and the core flowpath 70. The example depicted in FIG. 1 has a nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

FIG. 2 is a schematic cross-sectional view of an example open-rotor turbine engine according to one example of the present disclosure. Particularly, FIG. 2 illustrates an aviation three-stream turbofan engine herein referred to as "three-stream engine 100". The three-stream engine 100 of FIG. 2 can be mounted to an aerial vehicle, such as a fixed-wing aircraft, and can produce thrust for propulsion of the aerial vehicle. The architecture of the three-stream engine 100 provides three distinct streams of thrust-producing airflow during operation. Unlike the engine 10 shown in FIG. 1, the three-stream engine 100 includes a fan that is not ducted by a nacelle or cowl, such that it may be referred to herein as an "unducted fan," or the entire engine 100 may be referred to as an "unducted engine."

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 2, the core engine 120 includes a core cowl 122 that defines an annular core inlet 124. The core cowl 122 further encloses a low pressure system and a high pressure system. In certain examples, the core cowl 122 may enclose and support a booster or low pressure ("LP") compressor 126 for pressurizing the air that enters the core engine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example. After driving each of the turbines 132, 134, the combustion products exit the core engine 120 through a core exhaust nozzle 140 to produce propulsive thrust. Accordingly, the core engine 120 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example. For the depicted example of FIG. 2, the fan 152 is an open rotor or unducted fan. However, in other examples, the fan 152 may be ducted, e.g., by a fan casing or nacelle circumferentially surrounding the fan 152. As depicted, the fan 152 includes an array of fan blades 154 (only one shown in FIG. 2). The fan blades 154 are rotatable, e.g., about the longitudinal axis 112. The fan blades 154 can include multiple connection elements 400, 500, 600, 700, 800, and 900, further described in detail in FIGS. 4-9, to couple an example cover plate 304 to ones of the fan blades 154. As noted above, the fan 152 is drivingly coupled with the low pressure turbine 134 via the LP shaft 138. The fan 152 can be directly coupled with the LP shaft 138, e.g., in a direct-drive configuration. Optionally, as shown in FIG. 2, the fan 152 can be coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this example, each blade 154 of the fan 152 is rotatable about its respective central blade axis 156, e.g., in unison with one another. One or more actuators 158 can be controlled to pitch the blades 154 about their respective central blade axis 156. However, in other examples, each blade 154 may be fixed or unable to be pitched about its central blade axis 156.

The fan section 150 further includes a fan outlet guide vane array 160 that includes fan outlet guide vanes 162 (only one shown in FIG. 2) disposed around the longitudinal axis 112. For this example, the fan outlet guide vanes 162 are not rotatable about the longitudinal axis 112. Each fan outlet guide vane 162 has a root and a tip and a span defined therebetween. The fan outlet guide vanes 162 may be unshrouded as shown in FIG. 2 or may he shrouded, e.g., by an annular shroud spaced outward from the tips of the fan outlet guide vanes 162 along the radial direction R. Each fan outlet guide vane 162 defines a central blade axis 164. For this example, each fan outlet guide vane 162 of the fan outlet guide vane array 160 is rotatable about its respective central blade axis 164, e.g., in unison with one another. One or more actuators 166 can be controlled to pitch the fan outlet guide vane 162 about their respective central blade axis 164. However, in other examples, each fan outlet guide vane 162 may be fixed or unable to be pitched about its central blade axis 164. The fan outlet guide vanes 162 are mounted to a fan cowl 170.

As shown in FIG. 2, in addition to the fan 152, which is unducted, a ducted fan 184 is included aft of the fan 152, such that the three-stream engine 100 includes both a ducted and an unducted fan that both serve to generate thrust through the movement of air without passage through core engine 120. The ducted fan 184 is shown at about the same axial location as the fan outlet guide vane 162, and radially inward of the fan outlet guide vane 162. Alternatively, the ducted fan 184 may be between the fan outlet guide vane 162 and core duct 142, or be farther forward of the fan outlet guide vane 162. The ducted fan 184 may be driven by the low pressure turbine 134 (e.g., coupled to the LP shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The stationary struts 174 may each be aerodynamically contoured to direct air flowing thereby. Other struts in addition to the stationary struts 174 may be used to connect and support, the fan cowl 170 and/or core cowl 122. In many examples, the fan duct 172 and the core cowl 122 may at least partially co-extend (generally axially) on opposite sides (e.g., opposite radial sides) of the core cowl 122. For example, the fan duct 172 and the core cowl 122 may each extend directly from the leading edge 144 of the core cowl 122 and may partially co-extend generally axially on opposite radial sides of the core cowl.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the array of fan outlet guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 3:
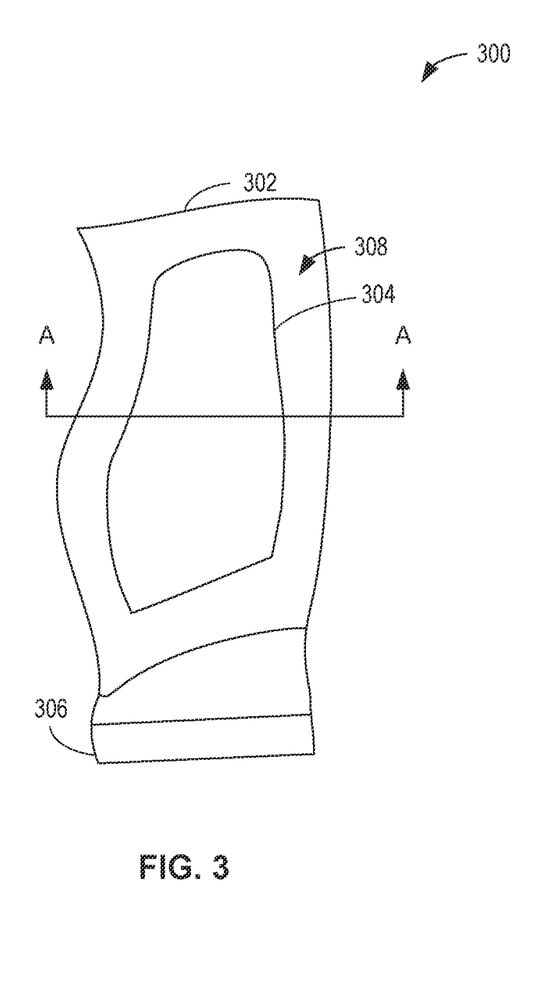
FIG. 3 illustrates an example fan blade assembly that can be implemented according to examples disclosed herein.

FIG. 3 illustrates an example fan blade assembly 300 in which examples disclosed herein can be implemented. The fan blade assembly 300 includes a fan blade 302 (e.g., the fan blades 42 of FIG. 1, the fan blades 154 of FIG. 2, etc.), a cover plate 304, and a root 306 (e.g., dovetail). In some examples, the blade 302 includes an aperture (e.g., opening) on a surface 308 of the blade 302. The opening can reveal a cavity within the body of the fan blade 302. Thus, the blade 302 can be a hollow airfoil. In some examples, the surface 308 defines the cavity within the body of the fan blade 302.

The cover plate 304 encloses (e.g., partially encloses, fully encloses, etc.) the opening on the surface 308 of the blade 302. In some examples, the cover plate 304 is machined to the same dimensions as the opening such that the cover plate 304 forms a continuous surface (e.g., flush surface) with the surface 308 of the blade 302. The cover plate 304 is mounted on to the surface 308 of the blade 302. In some examples the cavity within the body of the blade 302 is enclosed by the surface 308 and the cover plate 304. The cover plate 304 can be coupled (e.g., mounted) to the blade 302 via at least one connection element (e.g., multiple connection elements), described in detail in FIGS. 4-9. However, the at least one connection element, described in detail in FIGS. 4-9, can include a welded connection and/or an adhesive bond between the blade 302 and the plate 304.

In some examples, the cover plate 304 is mounted to the blade 302 via thermal interference (e.g., shrink fitting). The blade 302 may be heated to a higher temperature than the cover plate 304. When the cover plate 304 is mounted to the blade 302 at the opening in the surface 308 of the blade 302 the blade 302 cools and, subsequently, shrinks to fit the cover plate 304 at the opening.

Figure 4:
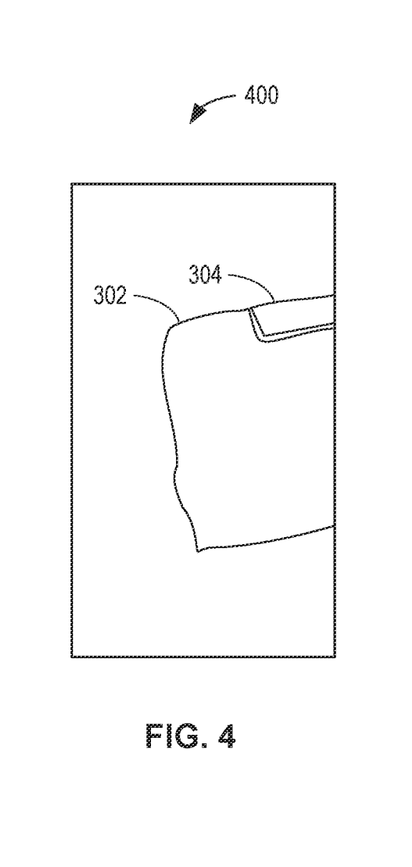
FIG. 4 is a cross-sectional view of an example connection element that can be implemented according to examples disclosed herein.

FIG. 4 is a cross-sectional view of the fan blade assembly 300 taken along plane A-A to illustrate an example connection element 400. The example connection element 400 includes the blade 302 coupled to the cover plate 304 via an edge lip connection 400. An edge of the cover plate 304 contacts an edge of the blade 302. In some examples, the blade 302 includes a rib at the opening. The example rib can be machined and/or shaped to contact the edge of the cover plate 304. In some examples, the edge-lip connection can be a welded connection and/or an adhesive bond.

Figure 5:
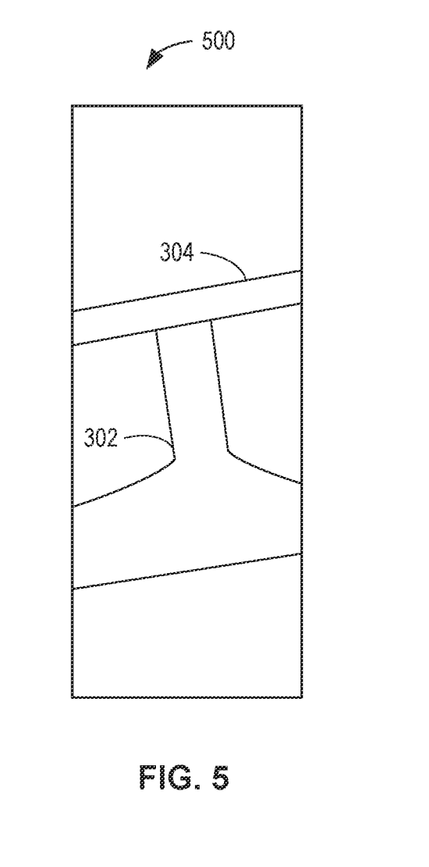

FIG. 5 is another cross-sectional view of the fan blade assembly 300 taken along plane A-A to illustrate an example connection element 500. The example connection element 500 includes the blade 302 coupled to the cover plate 304 via a butt joint connection 500. An edge and/or a rib of the blade 302 contacts a surface of the cover plate 304. In some examples, the butt joint connection can be a welded connection and/or an adhesive bond.

Figure 6:
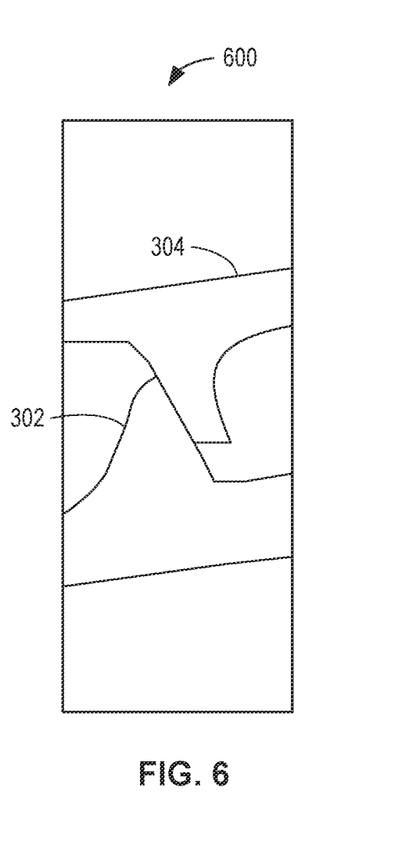
FIG. 6 is another cross-sectional view of an example connection element that can be implemented according to examples disclosed herein.

FIG. 6 is another cross-sectional view of the fan blade assembly 300 taken along plane A-A to illustrate an example connection element 600. The example connection element 600 includes the blade 302 coupled to the cover plate 304 via a slip joint connection 600. An edge and/or a rib of the blade 302 contacts an edge and/or a rib of the cover plate 304. In this example, the edge of the cover plate 304 is machined at an angle corresponding to the edge of the blade 302. In some examples, the butt joint connection can be a welded connection and/or an adhesive bond.

Figure 7:
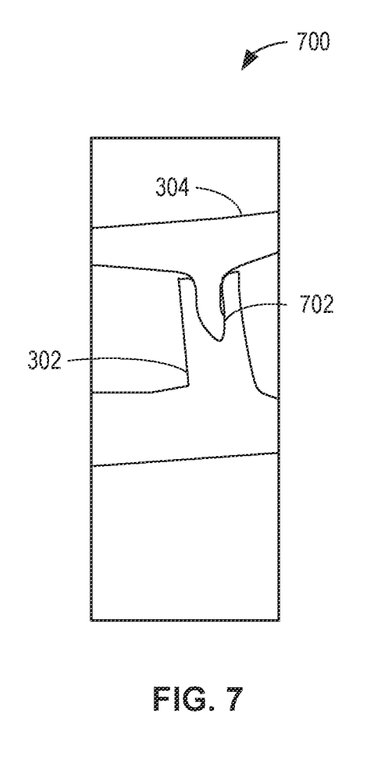
FIG. 7 is another cross-sectional view of an example connection element that can be implemented according to examples disclosed herein.

FIG. 7 is another cross-sectional view of the fan blade assembly 300 taken along plane A-A to illustrate an example connection element 700. The example connection element 700 includes the blade 302 coupled to the cover plate 304 via a double slip connection 700. A notch 702 (e.g., slot) in the blade 302 contacts (e.g., receives) an edge and/or a rib of the cover plate 304. In some examples, the double slip connection can be a welded connection and/or an adhesive bond.

Figure 8:
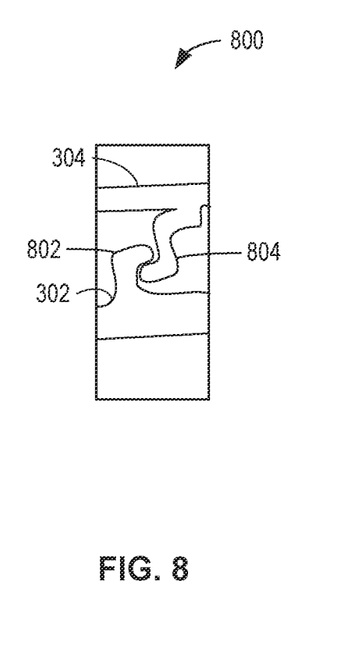
FIG. 8 is another cross-sectional view of an example connection element that can be implemented according to examples disclosed herein.

FIG. 8 is another cross-sectional view of the fan blade assembly 300 taken along plane A-A to illustrate an example connection element 800. The example connection element 800 includes the blade 302 coupled to the cover plate 304 via a mechanical interlock connection 800. A portion 802 (e.g., edge, rib, member) of the blade 302 contacts a portion 804 (e.g., edge, rib, member) of the cover plate 304. The portions 802, 804 are machined (e.g., shaped) to mechanically fit together such that blade 302 and the plate 304 interlock, in some examples, the mechanical interlock connection can be a welded connection and/or an adhesive bond.

Figure 9:
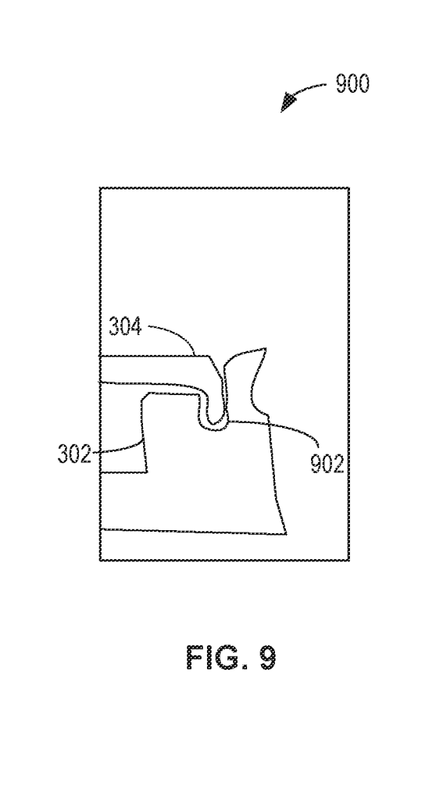
FIG. 9 is another cross-sectional view of an example connection element that can be implemented according to examples disclosed herein.

FIG. 9 is yet another cross-sectional view of the fan blade assembly 300 taken along plane A-A to illustrate an example connection element 900. The example connection element 900 includes the blade 302 coupled to the cover plate 304 via a slip edge joint connection 900. A notch 902 (e.g., slot) at the edge of the blade 302 contacts (e.g., receives) a rib at the edge of the cover plate 304. In some examples, the slip edge joint connection can be a welded connection and/or an adhesive bond.

In some examples, at least one connection element 400, 500, 600, 700, 800, or 900 is utilized to couple (e.g., mount) the cover plate 304 to the fan blade 302. However, multiple connection elements 400, 500, 600, 700, 800, or 900 can be utilized in combination to couple the cover plate 304 to the fan blade 302. For example, connection element 400 can mount the cover plate 304 to the fan blade 302 at a first edge of the opening of the fan blade 302 and connection element 900 can mount the cover plate 304 to the fan blade 302 at a second edge of the opening of the fan blade 302.

Although each example connection element disclosed above has certain features, it should be understood that it is not necessary for a particular feature of one example connection element to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

In some examples, the example fan blade assembly 300, the fan blades 42 of FIG. 1, and the fan blades 154 of FIG. 2 include means for connecting to couple the cover plate 304 to at least the surface 308 of the fan blade 302. For example, the means for connecting (e.g., the connecting means) may be implemented by example connection elements 400, 500, 600, 700, 800, or 900. In some examples, the means for connecting may be implemented by the cover plate 304 and/or the fan blade 302.

In some examples, the fan blade assembly 300, the fan blades 42 of FIG. 1, the fan blades 154 of FIG. 2, and the blade 302 include means tier covering to cover at least the surface 308 of the fan blade 302. For example, the means for covering (e.g., the covering means) may be implemented by the cover plate 304.

In some examples, the fan blade assembly 300, the fan blades 42 of FIG. 1, and the fan blades 154 of FIG. 2 include receiving means. For example, the receiving means may be implemented by the surface 308 of the fan blade 302.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that multi-point cover plate connections for a hollow fan blade. The disclosed systems, methods, apparatus, and articles of manufacture enable fuel savings and cost savings of an aircraft engine by reducing the weight of the engine and maintaining durability for an extended life of the fan blades and the engine.

Further aspects of the present disclosure are provided by the subject matter of the following clauses:

A blade for use in an aircraft engine, the blade including a hollow body including a surface defining a cavity, the hollow body including an aperture extending through the surface, a cover plate, and at least one connection element to couple the cover plate to the surface such that the cover plate encloses the aperture.

The blade of any preceding clause, wherein the at least one connection element is at least one of an edge lip connection, a butt joint connection, a slip joint connection, a double slip connection, a mechanical interlock connection, or a slip edge joint connection.

The blade of any preceding clause, wherein at least one of the edge lip connection, the butt joint connection, the slip joint connection, the double slip connection, the mechanical interlock connection, or the slip edge joint connection is a welded connection.

The blade of any preceding clause, wherein at least one of the edge lip connection, the butt joint connection, the slip joint connection, the double slip connection, the mechanical interlock connection, or the slip edge joint connection is adhesively bonded.

The blade of any preceding clause, wherein the at least one connection element is a thermal interference connection.

The blade of any preceding clause, wherein the hollow body includes a rib disposed on the surface surrounding the aperture, the at least one connection element to couple the cover plate to the rib.

The blade of any preceding clause, wherein the cavity is enclosed by the surface and the cover plate.

The blade of any preceding clause, wherein the cover plate is coupled to the surface to form a continuous surface of the blade.

An airfoil of a fan blade, including a surface defining a cavity, the airfoil including an opening extending through the surface, and a cover plate mounted to the surface via at least one connection element such that the cover plate encloses the opening.

The airfoil of any preceding clause, wherein the at least one connection element is at least one of an edge lip connection, a butt joint connection, a slip joint connection, a double slip connection, a mechanical interlock connection, or a slip edge joint connection.

The airfoil of any preceding clause, wherein at least one of the edge lip connection, the butt joint connection, the slip joint connection, the double slip connection, the mechanical interlock connection, or the slip edge joint connection is a welded connection.

The airfoil of any preceding clause, wherein at least one of the edge lip connection, the butt joint connection, the slip joint connection, the double slip connection, the mechanical interlock connection, or the slip edge joint connection is adhesively bonded.

The airfoil of any preceding clause, wherein the at least one connection element is a thermal interference connection.

The airfoil of any preceding clause, further including a rib disposed on the surface surrounding the opening, the at least one connection element to couple the cover plate to the rib.

The airfoil of any preceding clause, wherein the cavity is enclosed by the surface and the cover plate.

The airfoil of receding clause, wherein the cover plate is mounted to the surface to form a continuous surface of the fan blade.

A blade for use in an aircraft engine, the blade comprising receiving means defining a cavity, an aperture extending through the receiving means, a covering means, and at least one means for connecting to couple the covering means to the receiving means such that the covering means encloses the aperture.

The blade of any preceding clause, wherein the at least one means for connecting is at least one of an edge lip connection, a butt joint connection, a slip joint connection, a double slip connection, a mechanical interlock connection, or a slip edge joint connection.

The blade of any preceding clause, wherein the at least one means for connecting is at least one of a welded connection or an adhesive bond.

The blade of any preceding clause, wherein the at least one means for connecting is a thermal interference connection.

Although certain example systems, methods, apparatus, and articles of manufacture have been disclosed herein, the scope of coverage of this patent is not lit ted thereto. On the contrary, this patent covers all systems, methods, apparatus, and articles of manufacture fairly falling within the scope of the claims of this patent.

The following claims are hereby incorporated into this Detailed Description by this reference with each claim standing on its own as a separate embodiment of the present disclosure.

What is claimed is:

1. A blade for use in an aircraft engine, the blade comprising:
    a hollow body including a first surface defining a cavity, the hollow body including an aperture extending through the first surface, the first surface including a first rib protruding away from the first surface, the first rib including a second surface; and
    a cover plate including a second rib protruding from a third surface of the cover plate, the second rib including a fourth surface spaced apart from and facing the first surface, the second surface of the first rib spaced apart from and facing the third surface of the cover plate, the second and fourth surfaces positioned between the first and third surfaces, the second rib of the cover plate contacting the first rib of the hollow body to couple the cover plate to the first surface such that the cover plate encloses the aperture.

2. The blade of claim 1, wherein the contacting first and second ribs define a slip joint connection.

3. The blade of claim 2, wherein the slip joint connection is a welded connection.

4. The blade of claim 2, wherein the slip joint connection is adhesively bonded.

5. The blade of claim 1, wherein the contacting first and second ribs form a thermal interference connection.

6. The blade of claim 1, wherein the first rib is disposed on the first surface surrounding the aperture.

7. The blade of claim 1, wherein the cavity is enclosed by the third surface and the cover plate.

8. The blade of claim 1, wherein the cover plate is coupled to the first surface to form a continuous surface of the blade.

9. An airfoil of a fan blade comprising:
    a first surface defining a cavity, the airfoil including an opening extending through the first surface, the first surface including a first rib protruding away from the first surface, the first rib including a second surface; and
    a cover plate including a second rib protruding from a third surface of the cover plate, the second rib including a fourth surface spaced apart from and facing the first surface, the second surface of the first rib spaced apart from and facing the third surface of the cover plate, the second and fourth surfaces positioned between the first and third surfaces, the second rib mounted to the first rib such that the cover plate encloses the opening.

10. The airfoil of claim 9, wherein the first and second ribs define a slip joint connection.

11. The airfoil of claim 10, wherein the slip joint connection is a welded connection.

12. The airfoil of claim 10, wherein the slip joint connection is adhesively bonded.

13. The airfoil of claim 9, wherein the second rib is mounted to the first rib via a thermal interference connection.

14. The airfoil of claim 9, wherein the first rib is disposed on the first surface surrounding the opening.

15. The airfoil of claim 9, wherein the cavity is enclosed by the third surface and the cover plate.

16. The airfoil of claim 9, wherein the cover plate is mounted to the first surface to form a continuous surface of the fan blade.

17. A blade for use in an aircraft engine, the blade comprising:
    receiving means defining a cavity, an aperture extending through the receiving means, the receiving means including a first rib protruding away from the receiving means, the first rib including a first surface; and
    a covering means including a second rib protruding from a second surface of the covering means, the second rib including a third surface spaced apart from and facing the receiving means, the first surface of the first rib spaced apart from and facing the second surface of the covering means, the first and third surfaces positioned between the receiving means and the second surface, the second rib contacting the first rib to couple the covering means to the receiving means such that the covering means encloses the aperture.

18. The blade of claim 17, wherein the contacting first and second ribs is a slip joint connection.

19. The blade of claim 17, wherein the contacting first and second ribs are welded or adhesively bonded.

20. The blade of claim 17, wherein the first rib is coupled to the second rib via a thermal interference connection.

* * * * *